(12) United States Patent
Danyluk et al.

(10) Patent No.: US 10,671,682 B2
(45) Date of Patent: *Jun. 2, 2020

(54) MEDIA SELECTION AND DISPLAY BASED ON CONVERSATION TOPICS

(71) Applicant: INTERNATIONAL BUSINESS MACHINES CORPORATION, Armonk, NY (US)

(72) Inventors: Nicholas Danyluk, Poughkeepsie, NY (US); Kavita Sehgal, Poughkeepsie, NY (US); Diane Stamboni, Pleasant Valley, NY (US); Sneha Varghese, Fishkill, NY (US); John Werner, Fishkill, NY (US); Sarah Wu, Ulster County, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 257 days.

This patent is subject to a terminal disclaimer.

(21) Appl. No.: 15/802,582

(22) Filed: Nov. 3, 2017

(65) Prior Publication Data
US 2019/0087500 A1 Mar. 21, 2019

Related U.S. Application Data

(63) Continuation of application No. 15/709,992, filed on Sep. 20, 2017.

(51) Int. Cl.
*G06F 16/9535* (2019.01)
*G06F 16/48* (2019.01)
(Continued)

(52) U.S. Cl.
CPC ...... *G06F 16/9535* (2019.01); *G06F 16/4387* (2019.01); *G06F 16/48* (2019.01); *G06F 16/285* (2019.01); *G06F 16/4393* (2019.01); *G06F 16/639* (2019.01); *G06F 40/30* (2020.01); *H04L 67/22* (2013.01); *H04L 67/2804* (2013.01)

(58) Field of Classification Search
CPC ..... G06Q 50/01; H04L 67/306; G06F 16/285; G06F 16/4387; G06F 16/4393; G06F 16/639; G06F 3/0482
USPC .................................. 707/609, 627, 706
See application file for complete search history.

(56) References Cited

U.S. PATENT DOCUMENTS 5,970,179 A 10/1999 Ito
2010/0211575 A1 8/2010 Collins et al.
(Continued)

OTHER PUBLICATIONS

Danyluk et al "Media Selection and Display Based on Conversation Topics", U.S. Appl. No. 15/709,992, Sep. 20, 2017.
(Continued)

*Primary Examiner* — Dangelino N Gortayo
(74) *Attorney, Agent, or Firm* — Cantor Colburn LLP; Teddi Maranzano

(57) ABSTRACT

Technical solutions are described for selecting and retrieving, by a media retrieval system, media items for displaying. An example method for selecting and retrieving the media items includes monitoring a conversation of a user via a user device, and extracting a conversation topic from the conversation. The method further includes determining that a metadata database of a media storage associated with the user includes the conversation topic. The method further includes adding, in response, to a topic match database, from the media storage, an identity of a media item matching with the conversation topic, and adding, to a list of media items to be played back by a media display device, the topic match database. Further yet, the method includes playing back, by the media display device, the media item.

9 Claims, 5 Drawing Sheets

(51) Int. Cl.
  *G06F 16/438*  (2019.01)
  *G06F 16/638*  (2019.01)
  *G06F 16/28*   (2019.01)
  *H04L 29/08*   (2006.01)
  *G06F 40/30*   (2020.01)

(56) References Cited

U.S. PATENT DOCUMENTS

| | | |
|---|---|---|
| 2011/0004831 A1 | 1/2011 | Steinberg et al. |
| 2011/0252027 A1* | 10/2011 | Chen ................ G06F 16/335 |
| | | 707/728 |
| 2014/0003716 A1 | 1/2014 | Fedorovskaya et al. |
| 2014/0075352 A1 | 3/2014 | Hansen et al. |
| 2014/0088952 A1 | 3/2014 | Fife |
| 2015/0324099 A1 | 11/2015 | Tang |
| 2016/0080296 A1* | 3/2016 | Lewis ................ H04L 51/08 |
| | | 715/752 |
| 2016/0246848 A1 | 8/2016 | Nguyen |
| 2017/0250930 A1* | 8/2017 | Ben-Itzhak ........ G06F 3/0488 |
| 2017/0300535 A1* | 10/2017 | Papineni ............ G06F 16/332 |
| 2017/0310789 A1* | 10/2017 | Thomee .............. G06F 40/30 |
| 2018/0089315 A1 | 3/2018 | Seiber |
| 2018/0183739 A1* | 6/2018 | Foerster ............ H04L 51/10 |

OTHER PUBLICATIONS

List of IBM Patents or Patent Applications Treated as Related; (Appendix P), Filed Nov. 3, 2017; 2 pages.

* cited by examiner

MEDIA SELECTION AND DISPLAY BASED ON CONVERSATION TOPICS

DOMESTIC PRIORITY

This application is a continuation of U.S. Non-provisional application Ser. No. 15/709,992, entitled "MEDIA SELECTION AND DISPLAY BASED ON CONVERSATION TOPICS", filed Sep. 20, 2017, which is incorporated herein by reference in its entirety.

BACKGROUND

The present invention generally relates to an improvement to a computer system such as a system for selecting displaying media, and more specifically, to selecting media to display based on conversation topics.

Today, media-capture technology, such as in digital cameras, video-recorders, smartphones, wearable devices, and other types electronic devices, allows users to generate and store a large number of digital media items, such as photographs, videos, voice recordings, and so on. For example, a user may use his or her smartphone or wearable computing device to produce dozens (or even more) of media items in the course of a single day. Typically, the user may transfer these media items, or at least a selected few of these, to a personal computer and/or a cloud storage service.

Such a proliferation of digital media makes it difficult for users to later retrieve media items of interest. For example, a user may simply forget that certain media items exist. Alternatively, or in addition, a user may vaguely recollect generating the media items, but the user may have difficulty finding them and retrieving them from the storage. Typically, the user may organize collections of media items into meaningful folders, and then then search through a directory of folders to find the desired media items. Alternatively, or in addition, the user may add descriptive tags to the media items. The user may then use a search interface to attempt to find media items of interest, that is, by finding media items having tags which match specified search terms. Such approaches, however, are labor-intensive and cumbersome in nature, and are not always successful in retrieving the desired media items.

SUMMARY

Embodiments of the present invention are directed to selecting and retrieving, by a media retrieval system, media items for displaying. An example method for selecting and retrieving the media items includes monitoring a conversation of a user via a user device, and extracting a conversation topic from the conversation. The method further includes determining that a metadata database of a media storage associated with the user includes the conversation topic. The method further includes adding, in response, to a topic match database, from the media storage, an identity of a media item matching with the conversation topic, and adding, to a list of media items to be played back by a media display device, the topic match database. Further yet, the method includes playing back, by the media display device, the media item.

According to one or more embodiments of the present invention, a system includes a media display device for playing back a list of media items, and a media retrieval system that selects and retrieves media items. The selecting and retrieving includes monitoring a conversation of a user via a user device, and extracting a conversation topic from the conversation. Further, the selecting and retrieving includes determining that a metadata database of a media storage associated with the user includes the conversation topic, and adding, in response, to a topic match database, from the media storage, identity of a media item matching with the conversation topic. Further, the topic match database is added to the list of media items to be played back by the media display device.

According to one or more embodiments of the present invention a computer program product includes a computer readable storage medium having program instructions embodied therewith. The program instructions are executable by a processing circuit to cause the processing circuit to select and retrieve a plurality of media items. The selecting and retrieving includes monitoring a conversation of a user via a user device, and extracting a conversation topic from the conversation. Further, the selecting and retrieving includes determining that a metadata database of a media storage associated with the user includes the conversation topic, and adding, in response, to a topic match database, from the media storage, identity of a media item matching with the conversation topic. Further, the topic match database is added to the list of media items to be played back by the media display device.

BRIEF DESCRIPTION OF THE DRAWINGS

The examples described throughout the present document will be better understood with reference to the following drawings and description. The components in the figures are not necessarily to scale. Moreover, in the figures, like-referenced numerals designate corresponding parts throughout the different views.

DETAILED DESCRIPTION

Figure 1:
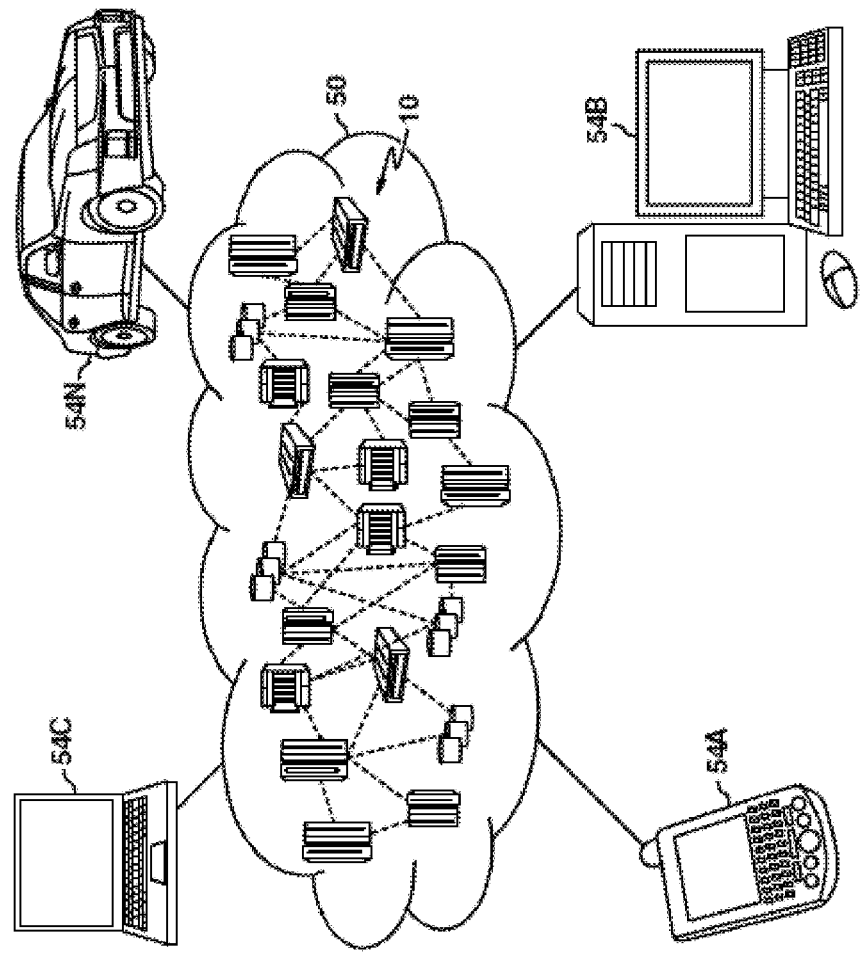
FIG. 1 depicts a cloud computing environment according to an embodiment of the present invention.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

The technical solutions described herein facilitate a media retrieval system that addresses a technical problem of providing users, an automatic selection and playback of media items, such as images, video, audio, and the like, based on the user's recent conversations. The technical solutions described herein address the technical problem by monitoring and analyzing the user's conversations, for example, text messages, social media posts, phones calls, everyday conversations (for example, using the user's mobile phone when the user's mobile device is in the users pocket), and others and a combination thereof, to extract conversation topics. The technical solutions further access media associated with the user, for example the user's mobile device storage, social media storage, cloud storage, and the like, and filters through the user's digital media items in search of media that match the conversation topics. The matching media items are then retrieved and played back, for example displayed, on one or more registered user devices, such as digital image display devices like digital picture frames, desktop screensavers, etc. The matching media items can also be filtered into an easy access folder on the user devices to facilitate the user to find a media item during the ongoing conversation.

Further yet, in one or more examples, the media items associated with the conversation topics may be further filtered according to the conversation topics or one or more thresholds configured by the user. In addition, in one or more examples, the technical solutions facilitate the media retrieval system to display the extracted conversation topics to the user prior to displaying corresponding media items, to facilitate the user to configure what media items are displayed on the user devices, which may be displayed publicly.

The technical solutions described herein may be implemented using cloud computing in one or more examples. It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
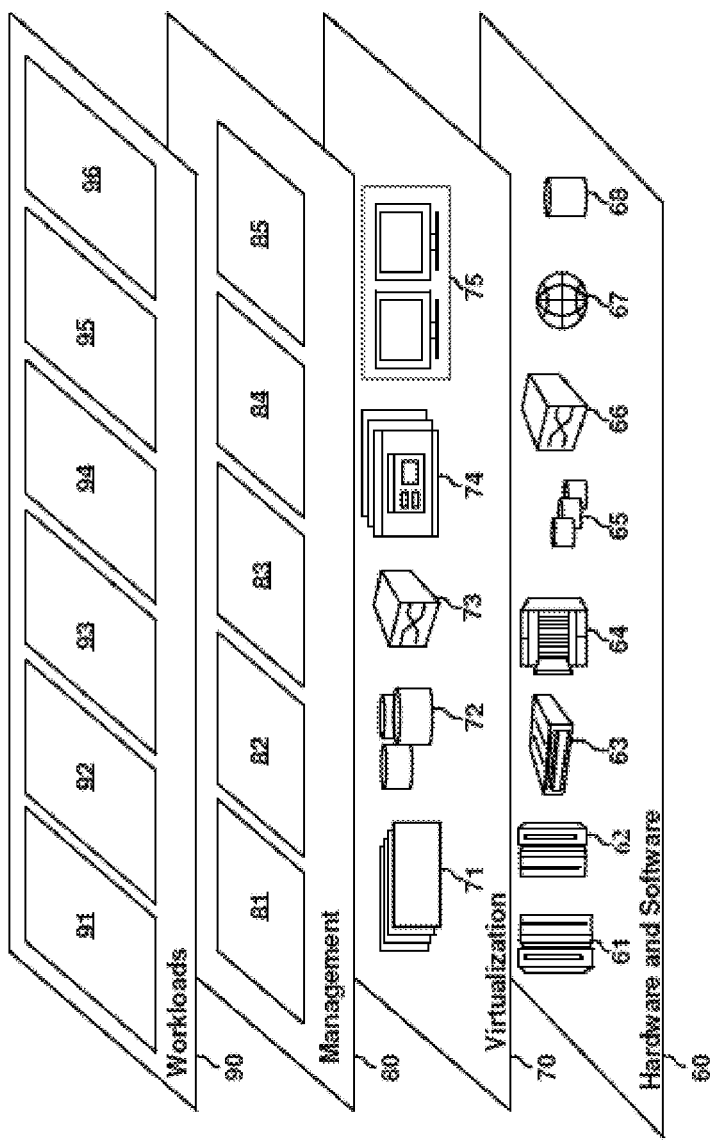
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and media retrieval and display 96.

Turning now to an overview of technologies that are more specifically relevant to aspects of the invention, traditional techniques for automatically presenting a media file on a specific device based on an analysis of metadata associated with the media file are based on the user being prompted to take an action related to the media file presented on that specific device. Alternatively, traditional techniques display media files on the device based on a location of that device.

According to one or more embodiments described herein the media retrieval system, facilitates the media selection and display, for example as a cloud based system, by analyzing a user's ongoing and/or recent conversations, for example text messages, social media posts, phones calls, everyday conversations (when a mobile device in the user's pocket), etc. to extract discussed conversation topics. The media retrieval system further accesses the user's media items, such as stored on the user's mobile device/social media, cloud storage, and the like, and filters through the storage in search of media items that match the conversation topics. The matching media items are then played back the user's registered digital image display devices such as digital picture frames, desktop screensavers, etc. The matching media items can also be filtered into an easy access folder on the user's devices to facilitate the user to find media items quickly during a conversation.

Thus, the technical solutions described herein facilitates automatic retrieval and playback of media items based on ongoing and/or recent conversations, such as based on analyzing the user's social media posts, text messages, phone calls, instant messenger messages, etc. and further using the microphone on the user's mobile device (or other devices) to monitor the user's conversations. The media retrieval according to the technical solutions herein further extracts media items that match the topics of conversation even when the user is not actively using a device, such as the mobile phone, or the like.

The technical solutions described herein thus provide a cognitive processing to learn and interpret conversations to extract the main topic such that the matching media items from the user's library can be pushed to his/her registered devices.

Further, the technical solutions described herein facilitate the media retrieval system to connect to multiple second devices of the user (e.g., digital picture frames) to display the user's media items on the first or second devices based on monitoring and analyzing conversations from a first device(s) of the user.

Further, in one or more examples, the technical solutions facilitate automatically selecting a top N media items associated with multiple conversation topics discussed by the user such that the conversation topics are covered with the corresponding matching media items. In one or more examples, the technical solutions described herein facilitate keeping track of the media items that have been displayed recently such that the same media items do not keep coming up.

The technical solutions described herein thus use the internet of things (IoT) system to access, select, and retrieve media items from the user's personal photo albums, social media accounts, mobile device, or any other media storage associated with the user, and display the media items on digital image displays devices of the user based on a link with one or more topics of conversation. In one or more examples, the technical solutions are implemented as one or more processes that execute in the background on one or more of the user's devices such that the user does not have to do anything different from a typical process of uploading the media items and registering the devices. In one or more examples, the media items undergo an auto-tagging process upon initial upload to facilitate being recalled at a later date.

The technical solutions thus address the technical problem where because of the large size of the user's personal media album and social media storage, it is common for the user to forget about previous media that was captured. Further, digital image displays can be set to cycle through specific albums, which are to be set up by the user. The technical solutions described herein facilitate a media retrieval system to automatically analyze topics discussed during one or more conversations on the user's device (such as mobile phone) and automatically selects media items that relate to the identified conversation topics. Seeing media relating to recent topics of conversation may be satisfying to the user and bring up related memories that they may have forgotten leading to greater human interaction. It can also be difficult for users to find media in the moment during a conversation. The technical solutions described herein facilitates the media retrieval system to filter out media items based on the conversation topics, thus facilitating the user to have a much smaller pool of media items to search through to find their desired media item related to the ongoing conversation. Thus, the technical solutions described herein facilitate improvement to a computer system, such as media retrieval and display systems.

Figure 3:
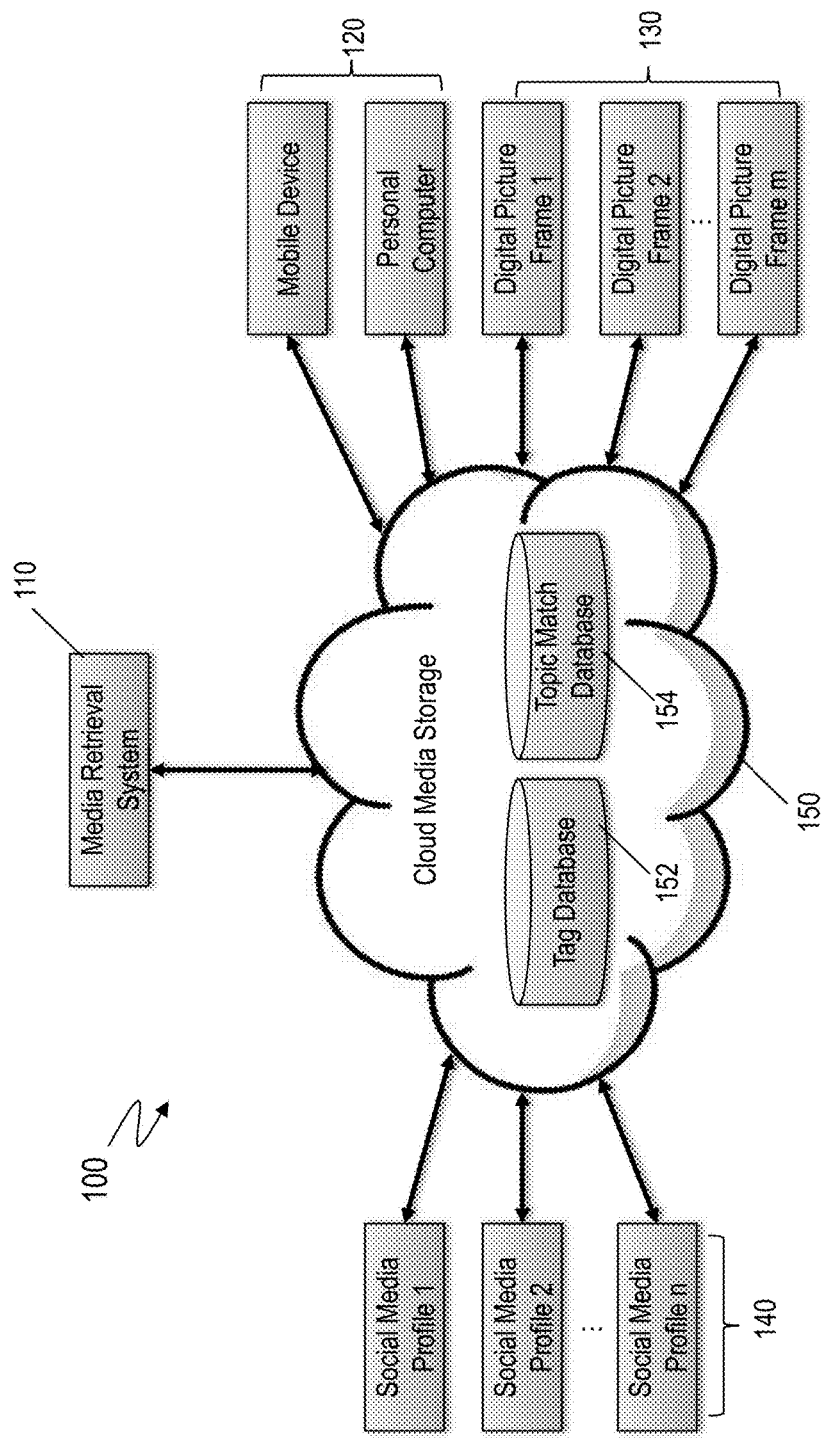
FIG. 3 depicts an example system for automatic media selection and retrieval based on user conversation topics according to one or more embodiments.

FIG. 3 depicts an example system 100 for automatic media selection and retrieval based on user conversation topics according to one or more embodiments. The system 100 includes, among other components, a media retrieval system 110, one or more user devices 120, one or more media display devices 130, one or more social media systems 140, and a cloud media storage 150.

In one or more examples, the media retrieval system 110 facilitates monitoring the one or more user devices 120 for detecting and monitoring one or more conversations of the user. The media retrieval system 110 further analyzes the conversations to identify one or more conversation topics and related metrics. The media retrieval system 110 further selects one or more media items from the cloud media storage 150, social media profiles 140, or user devices 120, which stores media items of the user. The media retrieval system 110 further sends the selected media items for display to the one or more media display devices 130.

The one or more media display devices 130 include electronic devices that are selected for displaying or playing back the one or more media items. For example, the one or more media display devices 130 include digital picture frames, computers, mobile devices, wearable devices, or any other electronic device that facilitates receiving/retrieving a media item over a communication network and displaying the media item. In one or more examples, the one or more media display devices 130 includes computers that display the retrieved media items, for example as screensavers or any other cyclical or constant manner.

The user devices 120 include one or more electronic devices that the user may use to have a conversation with another person or machine (artificial intelligence) or may be listening while the user is having a conversation in person. For example, the user devices 120 include mobile phones, computers, portable digital assistants, wearable devices, home automation devices, home assistant devices (e.g. AMAZON ECHO™, GOOGLE HOME™), or any other such electronic device. Further, the user devices 120 include chat applications, email applications, instant message applications, short messaging service applications, and other such applications that the user may use to converse. The media retrieval system 110 monitors the one or more user devices 120 and the conversations the user has using the user devices 120. In one or more examples, the user registers the user devices 120 with the media retrieval system 110 to authorize and facilitate the media retrieval system 110 to monitor and access such conversation data of the user devices 120.

For example, the conversation topics are extracted from conversations using text messages sent/received by the user via the one or more user devices 120. Alternatively, or in addition, conversation topics are extracted from software applications or computer program products that the user is using, such as for sending/receiving social media posts, for example on FACEBOOK™, TWITTER™, SNAPCHAT™, INSTAGRAM™, and the like. Alternatively, or in addition, conversation topics are extracted from voice calls and/or video calls, for example using a phone, FACETIME™, SKYPE™, or the like. Further, alternatively, or in addition, conversation topics are extracted from user's face to face conversations by accessing a microphone associated with the user, such as a microphone of a mobile device when the mobile device is not in use (e.g., in the pocket, purse, etc.). In one or more examples, the microphone may be part of a voice activated and/or controlled device that is part of the user devices 120 registered by the user.

In one or more examples, data from the user devices 120 is analyzed and main topics of conversation are extracted from the data by the media retrieval system 110. For example, the media retrieval system 110 uses application programming interface for conversation topic extractions (e.g., WATSON™ API's such as WEBDIALOG™, ALCHEMYAPI®, CONVERSATION, DIALOG, NATURAL LANGUAGE CLASSIFIER, PERSONALITY INSIGHTS, TONE ANALYZER, SPEECH TO TEXT, and VISUAL RECOGNITION, etc.). It should be noted that in other examples the APIs used may be different from those listed in the above examples. In one or more examples, a conversation (or discussion) includes multiple conversation topics. The media retrieval system 110 extracts the one or more topics from the conversation.

In addition to extracting the one or more conversation topics from the conversation (or discussion), the media retrieval system 110 keeps track of one or more attributes and/or metrics for each conversation topic. For example, the media retrieval system 110 keeps track of the amount of time spent discussing a topic and/or the person with whom the user is conversing. The media retrieval system 110 may also keep track of an order of topics in the conversation. The one or more attributes are used to prioritize the conversation topics, in one or more examples. Further, once the extracted conversation topics are prioritized, the media retrieval system 110 filters through the tagged media database to select and retrieve media items from the media storage 150.

The media storage 150 stores the one or more media items associated with the user. In one or more examples, the user provides the media retrieval system 110 authorization to access the media storage 150. It should be noted that although the media storage 150 is shown as a single cloud server in FIG. 3, the media storage 150 may be a distributed storage system. For example, the media storage 150 may include media items residing on the user devices 120 (e.g.: mobile device, personal computer). The media storage 150 further may include the media items stored on the one or more display devices 130. Alternatively, or in addition, the media storage 150 includes media items from one or more cloud storage devices that the user registers with and authorizes the media retrieval system 110 to access.

Further yet, the media storage system 150 includes media items from one or more social media systems 140. For example, the user registers his/her profile(s) from the corresponding social media systems, such as FACEBOOK™, TWITTER™, SNAPCHAT™, INSTAGRAM™, and the like with the media retrieval system 110 and authorizes the media retrieval system 110 to access media items from the social media systems 140. In one or more examples, the media retrieval system 110 accesses and retrieves media items from social media profiles of a second user, different from the (first) user that is registered with the media retrieval system 110 if the media items include the (first) user. In one or more examples, the second user authorizes the first user to use the media items uploaded by the second user on the social media systems 140 (e.g., friends or followers). Thus, the media retrieval system 110 can access and retrieve media items from one or more social media systems 140 using the user's profile as well as a different user's profile.

In one or more examples, the media storage 150 includes a tag database 152 that includes metadata associated with the one or more media items from the media storage 150. For example, upon initial upload or linking of a media item with the media storage 150, the media retrieval system 110 executes an auto-tagging. The auto-tagging generates one or more tags associated with the media item, for example, based on visual recognition, audio recognition, and other such automated processes. For example, the auto-tagging uses the APIs from analytic services, such as from WATSON™. For example, elements are identified in the media items, such as in images such as food, clothing, landmarks, signs, people, etc. Alternatively, or in addition, subjects from the media items are determined based on social media profiles or may require the user to tag a few initial photos. Media item metadata may also be extracted to determine the source (e.g., album A, mobile device B, Facebook friend C, etc.), date, time, etc. Alternatively, or in addition, the user (or any other user), when uploading or linking the media items with the media storage 150, associates one or more tags with the media items.

Based on the subjects, elements, and metadata, topics are automatically determined such as birthday, vacation, home, school, beach, baseball game, concert, ice cream, etc. A media item may have one or more topics. Further, in one or more examples, metadata is used to determine which media items were captured together so that common topics may be assigned to media items even if that information may not be extractable from the media item itself For example, the tag database 152 may include tags that identify one or more topics associated with the media items. For example, the tags may include descriptive keywords of an event associated with the media item such as birthday, vacation, eclipse, sunrise, sunset, graduation, anniversary, and the like. In addition to the tags, including objects and/or scenario identified in the media items such as the beach, mountain, flowers, river, lake, celestial bodies, and so on. Alternatively, or in addition, the tags may include identifiers of one or more people such as names, usernames, profile names etc. of one or more people identified in the media items. It should be noted that the tag database 152 may include other tags than the examples listed above. Further yet, the tag database 152 includes metadata such as capture time, capture location, capture device configuration (ISO level, shutter exposure, macro mode, lens type etc.), image quality (e.g.: resolution) which may be stored as tags in one or more examples.

Further, the media storage 150 includes a topic match database 154 that includes the media items, or links to the media items that the media retrieval system 110 filters and retrieves based on the extracted conversation topics. For example, the topic match database 154 is a folder that the user can access at any time to search through the matching media items if the user is looking for one in particular based on a recently discussed topic. Thus, the topic match database 154 makes it easier for the user to find media items, such as pictures, audio, video, etc. associated with an ongoing and/or recent conversation.

For example, consider an example where the media retrieval system 110 detects conversations of the user where the conversation is about what to buy for his/her kids birthday. Here, for example, the media retrieval system 110 extracts 'kids birthday' as a conversation topic and matches previous media items, for example, that kids previous birthdays. The matched images are linked or stored in the topic match database 154. In one or more examples, the user is provided a notification that he topic match database 154 has been updated, so that the user can go to the topic match database 154 and view the images and revisit the enjoyable memories. In addition, or alternatively, the media items from the topic match database 154 are displayed on the media display devices 130 registered with the media retrieval system 110, such as on one or more digital picture frames, desktop screensavers, wallpapers, etc.

In one or more examples, the topic match database 154 also stores a list of the extracted/identified conversation topics (keywords describing the topics). The list may be interactive and the user may add, edit, and/or delete a conversation topic from the list of topics. For example, in the above scenario, if the user is planning a surprise party for the birthday, the user may not want the media images to be shown on the registered display devices 130. Accordingly, the user may remove the conversation topic from the list so that the media retrieval system 110 does not display such images and/or other types of media items.

It should be noted that although an example of birthday is described above, various other example scenarios are possible.

Figure 4:
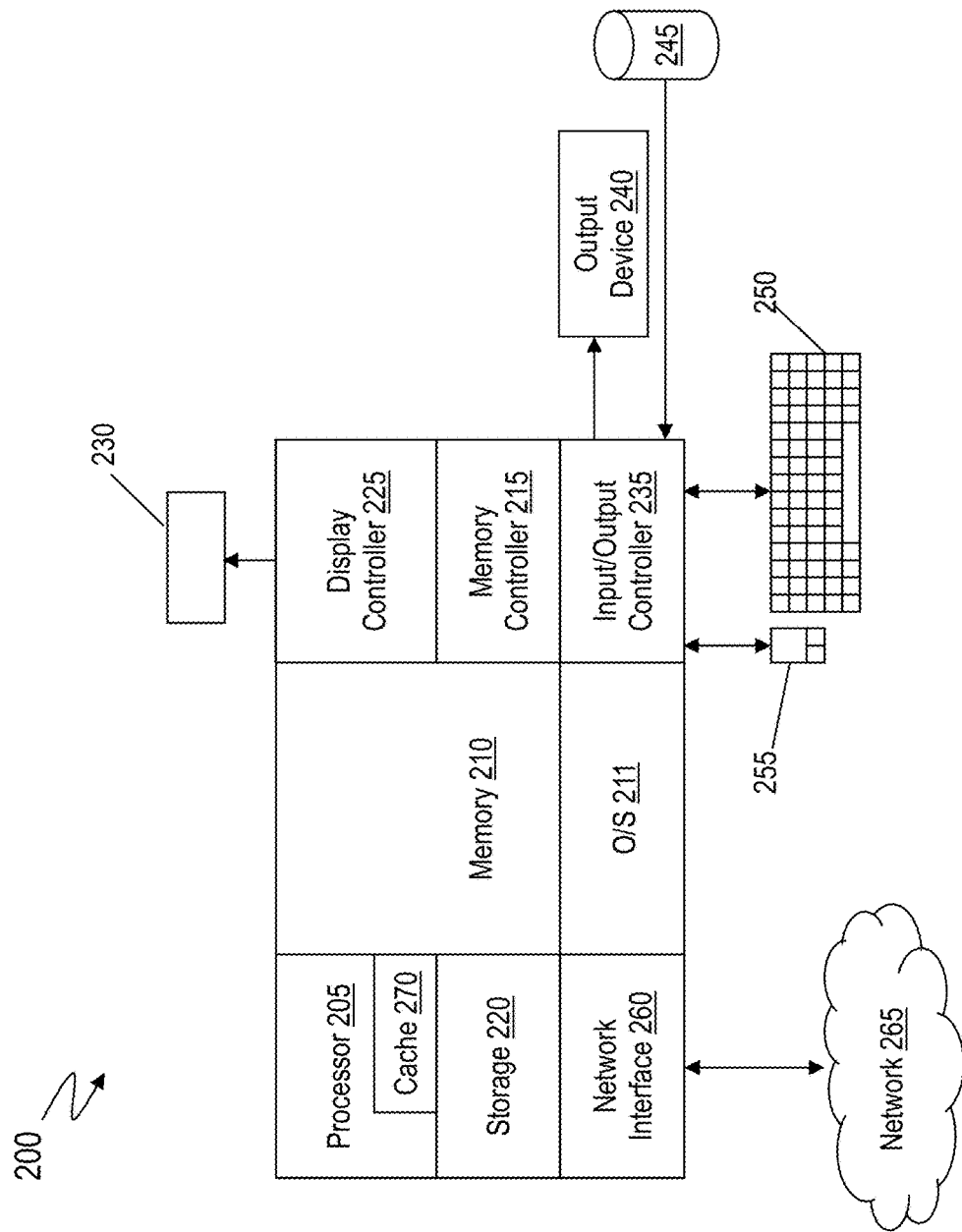
FIG. 4 illustrates an example system according to one or more embodiments.

FIG. 4 illustrates an example system 200 according to one or more embodiments. The system 200 may be a communication apparatus, such as a computer. For example, the system 200 may be a desktop computer, a tablet computer, a laptop computer, a phone, such as a smartphone, a server computer, or any other device that communicates via a network 265. In one or more examples, the system 200 is the media retrieval system 110. Further, in one or more examples, the system 200 may be one of the user devices 120. Further, in one or more examples, the system 200 may be one of the display devices 130. Further, in one or more examples, the system 200 may be one of the social media systems 140. Further yet, in one or more examples, the system 200 may be the cloud storage system 150.

The system 200 includes, among other components, a processor 205, memory 210 coupled to a memory controller 215, and one or more input devices 245 and/or output devices 240, such as peripheral or control devices that are communicatively coupled via a local I/O controller 235. These devices 240 and 245 may include, for example, battery sensors, position sensors, indicator/identification lights and the like. Input devices such as a conventional keyboard 250 and mouse 255 may be coupled to the I/O controller 235. The I/O controller 235 may be, for example, one or more buses or other wired or wireless connections, as are known in the art. The I/O controller 235 may have additional elements, which are omitted for simplicity, such as controllers, buffers (caches), drivers, repeaters, and receivers, to enable communications.

The I/O devices 240, 245 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 205 is a hardware device for executing hardware instructions or software, particularly those stored in memory 210. The processor 205 may be a custom made or commercially available processor, a central processing unit (CPU), an auxiliary processor among several processors associated with the system 200, a semiconductor based microprocessor (in the form of a microchip or chip set), a macroprocessor, or other device for executing instructions. The processor 205 includes a cache 270, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 270 may be organized as a hierarchy of more cache levels (L1, L2, and so on.).

The memory 210 may include one or combinations of volatile memory elements (for example, random access memory, RAM, such as DRAM, SRAM, SDRAM) and nonvolatile memory elements (for example, ROM, erasable programmable read only memory (EPROM), electronically erasable programmable read only memory (EEPROM), programmable read only memory (PROM), tape, compact disc read only memory (CD-ROM), disk, diskette, cartridge, cassette or the like). Moreover, the memory 210 may incorporate electronic, magnetic, optical, or other types of storage media. Note that the memory 210 may have a distributed architecture, where various components are situated remote from one another but may be accessed by the processor 205.

The instructions in memory 210 may include one or more separate programs, each of which comprises an ordered listing of executable instructions for implementing logical functions. In the example of FIG. 2, the instructions in the memory 210 include a suitable operating system (OS) 211. The operating system 211 essentially may control the execution of other computer programs and provides scheduling, input-output control, file and data management, memory management, and communication control and related services.

Additional data, including, for example, instructions for the processor 205 or other retrievable information, may be stored in storage 220, which may be a storage device such as a hard disk drive or solid state drive. The stored instructions in memory 210 or in storage 220 may include those enabling the processor to execute one or more aspects of the systems and methods described herein.

The system 200 may further include a display controller 225 coupled to a user interface or display 230. In some embodiments, the display 230 may be an LCD screen. In other embodiments, the display 230 may include a plurality of LED status lights. In some embodiments, the system 200 may further include a network interface 260 for coupling to a network 265. The network 265 may be an IP-based network for communication between the system 200 and an external server, client and the like via a broadband connection. In an embodiment, the network 265 may be a satellite network. The network 265 transmits and receives data between the system 200 and external systems. In some embodiments, the network 265 may be a managed IP network administered by a service provider. The network 265 may be implemented in a wireless fashion, for example, using wireless protocols and technologies, such as WiFi, WiMax, satellite, or any other. The network 265 may also be a packet-switched network such as a local area network, wide area network, metropolitan area network, the Internet, or other similar type of network environment. The network 265 may be a fixed wireless network, a wireless local area network (LAN), a wireless wide area network (WAN) a personal area network (PAN), a virtual private network (VPN), intranet or other suitable network system and may include equipment for receiving and transmitting signals.

Figure 5:
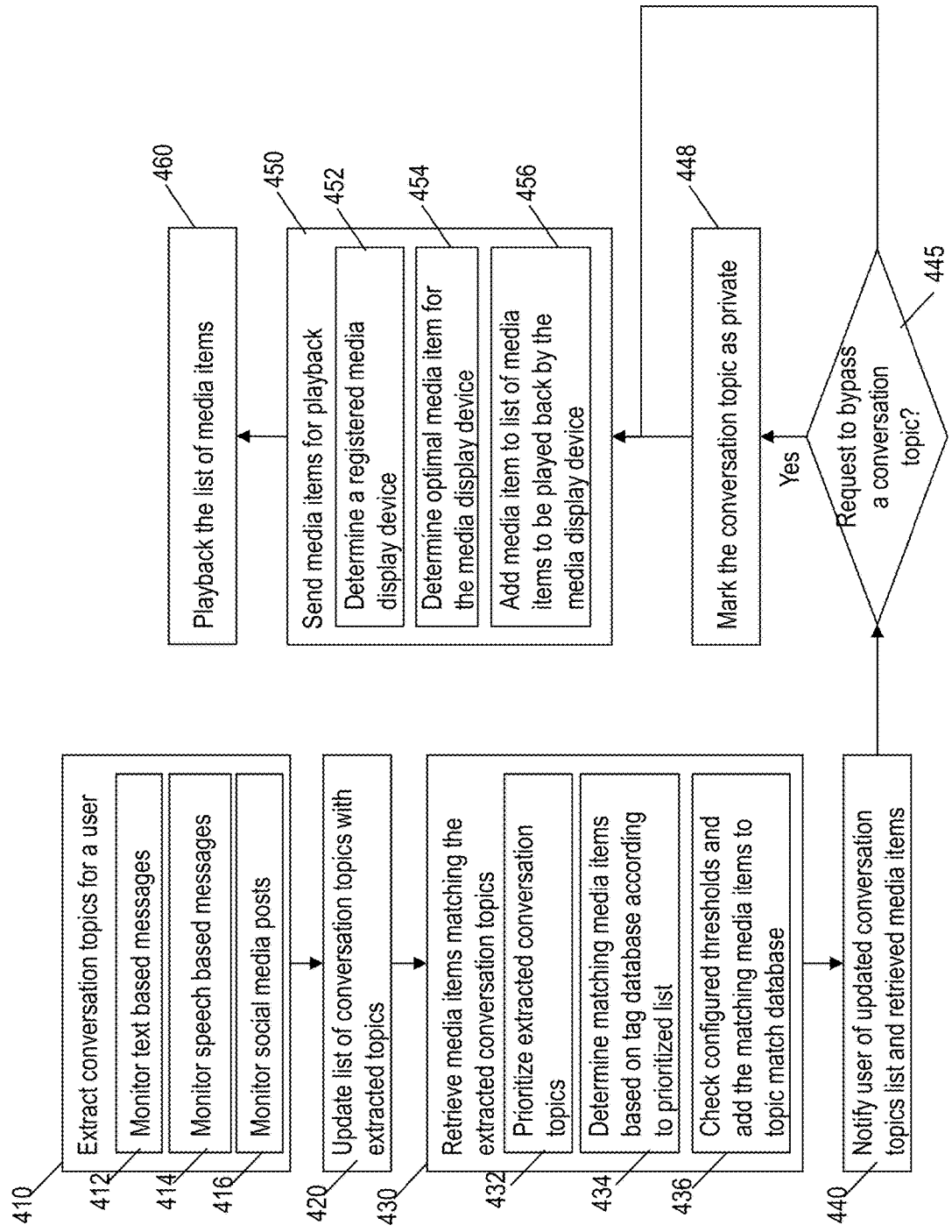
FIG. 5 illustrates a flowchart of an example method for selecting and retrieving, by the media retrieval system, a plurality of media items according to one or more embodiments.

FIG. 5 illustrates a flowchart of an example method for selecting and retrieving, by the media retrieval system, a plurality of media items according to one or more embodiments. The media retrieval system 110 monitors one or more conversations of the user via the user devices 120. For each conversation, the media retrieval system 110 extracts conversation topics, as shown at block 410. In one or more examples, the monitoring and extraction are performed on text based messages sent/received via the user device 120, as shown at block 412. For example, the text based messages include e-mail, instant messenger messages, chat messages, text messages (e.g. SMS), and any other type of text based messages sent/received via the user device 120. The text from the messages is analyzed to extract one or more conversation topics from the conversation. The extraction may be performed using one or more APIs, such as those for WATSON™, or any other artificial intelligence service.

In one or more examples, the monitoring and extraction are performed on speech based messages, as shown at block

414. The speech based messages may include phone conversations, recorded voice messages, and video chats (e.g., FACETIME™, SKYPE™) via the user device 120 by using the user device actively. Alternatively, or in addition, the speech based messages include monitoring the user's face-to-face conversations in the background when the user device 120 is not actively in use. For example, the user device 120 may be in the user's pocket, purse, bag, or in a predetermined vicinity from the user where the user device 120 can monitor the user's conversation. In one or more examples, the speech monitored in the background is converted into text using one or more speech-to-text engines, and the resulting text is analyzed to extract one or more conversation topics from the conversation.

Further, in one or more examples, the monitoring and extraction is performed on social media posts of the user, as shown at block 416. In one or more examples, the social media posts are analyzed similar to the text-based messages to extract one or more conversation topics.

The media retrieval system 110 maintains a list of extracted conversation topics. For example, media retrieval system 110 adds the extracted conversation topics to the list of topics, as shown at block 420. In one or more examples, the list of conversation topics also includes attributes of each topic, such as a number of times the conversation topic has been used recently, where 'recently' includes a predetermined duration prior to the current time. For example, the recent duration is configurable, such as 2 days, 1 week, 1 month, and the like. The attributes for the topic may further include a place-order of the conversation topic in the conversation, where the place-order indicates an order in which the conversation topic was used in the conversation. In one or more examples, an average place-order is maintained for each conversation topic. The attributes may further include a timestamp corresponding the last time the conversation topic was discussed. Further, the attributes include an amount of time the conversation topic was discussed in each conversation. Alternatively, or in addition, an average amount of time the conversation topic was discussed is listed. The attributes also include a frequency of a conversation topic being used in different conversations of the user. The attributes further include an identity of one or more (other) users with whom the conversation topic was discussed by the user of the media retrieval system 110.

In one or more examples, the list of extracted conversation topics has a configurable threshold. Accordingly, updating the list includes removing conversation topics to maintain the number of conversation topics in the list under or equal to the threshold. In one or more examples, oldest conversation topics, based on the last time the conversation topic was discussed, are removed. Alternatively, or in addition, in one or more examples, least frequently used conversation topics are removed. It should be noted that in other examples, different attributes or a combination thereof may be used to remove one or more conversation topics from the list when adding newly extracted conversation topics.

Referring back to FIG. 5, the media retrieval system further automatically retrieves media items matching the extracted conversation topics from the list of conversation topics, as shown at block 430. In one or more examples, the retrieval may be performed only for newly extracted conversation topics. The retrieval of the media item from the media storage 150 includes prioritizing the extracted conversation topics, as shown at block 432. For example, the prioritization may be based on one or more of the attributes of the conversation topics. For example, the prioritization includes ordering the conversation topics according to the frequency of use of the topics. Alternatively, or in addition, the prioritization includes ordering the conversation topics according to the amount of time each topic is discussed. Alternatively, or in addition, the prioritization includes ordering the conversation topics according to an order in which the conversation topic is discussed in a conversation. It should be noted that in other examples, different attributes or a combination thereof may be used to prioritize the conversation topics.

Further, retrieval of the media items includes determining matching media items based on tag database 152 according to the prioritized list of conversation topics, as shown at block 434. In one or more examples, the media retrieval system 110 determines if a tag corresponding to the conversation topic exists in the tag database 152. If the tags exist, the corresponding media items of the tags are identified as matching the conversation topic.

In one or more examples, the retrieval further includes checking configured thresholds of each conversation topic and adding the matching media items to topic match database 154, as shown at block 436. In one or more examples, the topic match database 154 is an easy access folder on the user device 120 that the user can use to find a media item, such as a photo, quickly during an ongoing conversation. Alternatively, or in addition, the topic match database 154 is a constantly updating folder that holds links to the media items from the media storage 150. In one or more examples, the media items in the topic match database 154 are separated into sub-folders based on the extracted topics for easy reference by the user to view the collection of media items matching his/her conversations.

Further yet, the media retrieval system 110 maintains one or more attributes of the matching media items added in the topic match database 154. For example, the media retrieval system 110 maintains a percentage or frequency of matches for a media item, where the percentage or frequency is based on a number of extracted conversation topics matching the media item. The media retrieval system 110 also maintains a number of media items identified as matching for a conversation topic. In one or more examples, each conversation topic is associated with a predetermined threshold number of matching media items to retrieve. The media retrieval system 110 further tracks a number of times a media item has been retrieved and displayed.

In one or more examples, the media retrieval system 110 retrieves matching media items into the media storage 150 based on the one or more attributes tracked for the media items. For example, media items with the greatest match percentage are filtered to the top for retrieval and display by the registered media display devices. Alternatively, or in addition, based on the threshold for a number of matching media items set, in cases where a larger number of matching media items are found for an extracted conversation topic, the lowest matches are filtered out. For example, the lowest/greatest match is determined based on the number of tag matches, the number of "likes", most viewed photos, age of media items, photo quality, or other such attributes. To ensure coverage of the various conversation topics, thresholds are set so that the top N photos are chosen for each topic. In one or more examples, the threshold (N) is variable dependent upon attributes of the conversation topics, such as how often the user conversed on that topic, amount of time for the conversation topics, etc.

In one or more examples, identical media items that appear in multiple locations (e.g., personal mobile device library and social media) are recognized such that information is shared (e.g., likes, views, etc.) but only the higher quality media item is flagged (typically social media applications will compress media items upon upload so the media item from the user's mobile device is flagged instead of the posted media item) for retrieval and display. In one or more examples, the media items in the topic match database 154 are removed when a corresponding conversation topic is removed from the list of conversation topics.

Further, the media retrieval system 110 notifies the user of the updated conversation topics list and retrieved media items in the topic match database 154, as shown at block 440. For example, the notification may be in the form of an email, a popup, a text message, or any other audio-visual manner. The notification is sent via the user devices 120. In one or more examples, the media retrieval system 110 does not update the displayed media items in the media display devices 130 until the extracted conversation topics are accepted by the user. Alternatively, in one or more examples, the media retrieval system updates the media display devices to playback the updated list of media items once the matching media items have been identified.

In one or more examples, in response to the notification, the user interacts with the list of conversation topics. In one or more examples, the user may reconfigure the priority of the conversation topics. In one or more examples, the user may request to bypass a conversation topic, as shown at block 445. For example, the user may not want media items related to a specific conversation topic (for example, an event about a surprise party) to be publicly viewable on the media display devices 130. In such cases, the user may request to bypass such conversation topics. In response to the user requesting to bypass a conversation topic, the media retrieval system 110 marks the conversation topic as private in the list of conversation topics, as shown at block 448.

In one or more examples, in response to marking the conversation topic private, the corresponding matching media items from the topic matching database 154 are not displayed on the media display devices 130. For example, the subfolder of media items associated with the private conversation topic is marked as private so that the media display devices 130 do not access the media items from that subfolder. Alternatively, or in addition, the media retrieval system 110 does not include the subfolder and/or media items from that subfolder corresponding to the private conversation topic in the list of media items to be played back by the media display devices 130. Alternatively, or in addition, the user may disable the conversation tracking at any time or remove unwanted topics that were registered previously.

Further, for the conversation topics that are not marked as private, the media retrieval system 110 sends corresponding media items and/or subfolders containing the media items for playback, as shown at block 450. In one or more examples, sending the media items includes determining the one or more registered media display devices 130, as shown at block 452. The registered media display device 130 is identified based on information provided by the user when registering the media display device 130. For example, the user provides a device identification including a network address, such as an IP address, a MAC address, or the like, to facilitate the media retrieval system 110 to communicate with the media display device 130 over the network 265.

The media retrieval system 110 further adds the media item to the list of media items to be played back by the media display device 130. For example, the media display devices 130 may be of different types, such as different types of picture frames, screensavers, media-cycling application, wallpaper displaying application, or the like. In one or more examples, the media retrieval system 110 forwards the media item from the media storage 150 to the media display device 130 based on the type of the media display device. For example, the media retrieval system 110 determines an optimal media item for the media display device 130 and forwards the optimal media item, as shown at block 454. For example, the media retrieval system 110 determines an optimal quality for the media display device 130 and forwards a copy of the media item corresponding to the optimal quality. For example, the quality may be an image resolution, color quality, sound quality, audio codec, or other such media attributes supported by the media display device 130. In one or more examples, the media retrieval system may convert the media item to the corresponding format supported by the media display device 130 then send the converted media item to the media display device 130.

Alternatively, or in addition, if various copies of the media item are available on the media storage 150, the media retrieval system 110 determines the copy of the media item that is supported by the media display device 130 and sends that copy to the media display device 130. For example, if identical photos may appear in multiple locations (e.g., personal mobile device library and social media). The media retrieval system 110 recognizes such that information is shared (e.g., likes, views, etc.) but only the higher quality image is flagged because the social media application compresses the photo upon upload so the photo from the users mobile device is flagged and used for displaying instead of the posted photo on the social media.

Further, in one or more examples, sending the media items to the media display device 130 includes adding the media item to the list of media items to be played back by the media display device 130, as shown at block 456. Thus, media items matching the extracted topics are queued up for viewing by the user on digital picture frames, computer screensavers, and are available in an easy to find location on the user device 130. The user devices 130 playback the media items on the list, as shown at block 460.

In one or more examples, the media retrieval system 110 facilitates the user to mark/flag media items that weren't good matches with a conversation topic. In one or more examples, such flagging updates and improves the tag database 152. Further, as described herein, the media retrieval system 110 tracks the number of times media items are displayed so that the user does not see the same media items repeatedly. For example, after a media item has been displayed a threshold number of times, such as 5 times, 10 times, or the like, the media item is removed from the list of media items to be played back. In one or more examples, a replacement matching media item is determined and added to the list. Alternatively, or in addition, media items remain active in the list until new topics are identified, and older, or media items corresponding to lower priority conversation topics are removed and replaced.

The technical solutions described herein thus facilitate filtering of media items, such as photos, videos, etc. for digital picture frames, screensavers, etc. Filtering of media items is dependent on conversation topics that the user recently discussed. Text messages, social media posts, phone conversations, etc. are monitored to extract recent conversational topics. Media items are analyzed by image recognition services and tagged. The tags are used to select the media items to display on digital picture frames, screen savers, etc. that match the recent conversation topics. The technical solutions herein facilitate automatic media item retrieval and selection, without any user interaction. In one or more examples, the technical solutions facilitate the user to prioritize the conversation topics for which to display media items.

Example scenarios where the technical solutions may be used include where phone conversations of a user on what to buy for his/her kids birthday matches previous images of that kids previous birthdays. Other birthday images may appear and if a threshold number of images are exceeded, lesser known users (determined from full photo album) or adult's birthdays may be excluded to keep with the theme of kid's birthdays.

In another example, texts among a group of friends on potential vacation spots are matched with previous vacation photos that are displayed. This may help to spark good memories to revisit a location, bad memories to avoid a location, or change the mindset of where the user may want to go (e.g., beach vs. sightseeing). In one or more examples, vacation photos that contain the user's friends in the text message conversation are given higher priority than other vacation photos, such as old family vacation photos. Further, if a specific location is mentioned in the text conversation and the user has photos from that location, those photos may be given a higher priority. Further yet, if a specific past vacation was discussed, photos from that vacation are given higher priority.

Further, if both of the conversations from above examples happen on the same day, photos from each case can be mixed when displayed on the media display devices. Further, if the maximum number of photos for the topic match database is exceeded, higher priority is given to the more urgent conversation topic among the two. For example, if the phone conversation indicates that the birthday is two weeks away and the vacation is four months into the future, the birthday pictures get higher priority in this example.

The technical solutions described herein thus facilitate analyzing a user's conversations such as text messages, social media posts, phones calls, everyday conversations (when the mobile device in the users pocket), etc. to extract discussed conversation topics, and filtering through media items associated with the user in search of media items that match the recently discussed topics. The matching media items are then selected and retrieved in a quick search database or folder. The matching media items are also displayed on digital image display devices such as digital picture frames, desktop screensavers, etc. The matching media items in an easy access folder facilitate the user to find a media item quickly during a conversation.

The present technical solutions may be a system, a method, and/or a computer program product at any possible technical detail level of integration. The computer program product may include a computer readable storage medium (or media) having computer readable program instructions thereon for causing a processor to carry out aspects of the present technical solutions.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present technical solutions may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, <N>, or combinations thereof" or "<A>, <B>, . . . and/or <N>" are to be construed in the broadest sense, superseding any other implied definitions hereinbefore or hereinafter unless expressly asserted to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Such computer storage media may be part of the device or accessible or connectable thereto. Any application or module herein described may be implemented using computer readable/executable instructions that may be stored or otherwise held by such computer readable media.

The descriptions of the various embodiments of the technical features herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   selecting and retrieving, by a media retrieval system, a plurality of media items, the selecting and retrieving comprising:
   monitoring a conversation of a user via a user device;
   extracting a conversation topic from the conversation;
   determining that a metadata database of a media storage associated with the user includes the conversation topic;
   adding, in response, to a topic match database, from the media storage, an identity of a media item matching with the conversation topic;
   displaying a notification to a user indicating the conversation topic that is extracted;
   receiving a user input indicative of a selection or bypassing of the conversation topic to automatically display the matching media item;
   in response to receiving the user input indicative of bypassing the conversation topic, marking the topic match database as private; and
   in response to receiving the user input indicative of using the conversation topic, marking the topic match database as public, and adding, to a list of media items to be played back by a media display device, the media item included in the topic match database.

2. The computer-implemented method of claim 1, wherein the conversation comprises one or more text messages sent and/or received by the user device.

3. The computer-implemented method of claim 1, wherein the conversation comprises one or more electronic messages sent and/or received by the user device, the electronic messages consists of one from a group of e-mail, chat message, and voice message.

4. The computer-implemented method of claim 1, wherein the conversation comprises one or more social media posts sent and/or received by the user device.

5. The computer-implemented method of claim 1, wherein the conversation comprises one or more phone conversations using the user device.

6. The computer-implemented method of claim 1, wherein the conversation comprises a face-to-face conversation monitored in the background by a microphone of the user device.

7. The computer-implemented method of claim 1, wherein the user is a first user, and the media storage comprises a first media store of the first user, and a second media store of a second user, and wherein the media items retrieved from the second media store include an image of the first user.

8. The computer-implemented method of claim 1, wherein adding the identity of media item to the topic match database further comprises:
   monitoring a number of times the conversation topic is used by the user; and
   extracting the conversation topic in response to the number of times exceeding a predetermined threshold.

9. The computer-implemented method of claim 1, wherein the conversation topic is associated with a predetermined threshold of number of media items to be selected and retrieved from the media storage.

\* \* \* \* \*